US012116222B2

United States Patent
Thompson (10) Patent No.: US 12,116,222 B2
(45) Date of Patent: Oct. 15, 2024

(54) AUTOMATIC HEADLAND FAN CONTROL

(71) Applicant: CNH Industrial Canada, Ltd., Saskatoon (CA)

(72) Inventor: Dennis George Thompson, Saskatchewan (CA)

( * ) Notice: Subject to any disclaimer, the term of this patent is extended or adjusted under 35 U.S.C. 154(b) by 153 days.

(21) Appl. No.: 17/565,094

(22) Filed: Dec. 29, 2021

(65) Prior Publication Data
US 2023/0202777 A1    Jun. 29, 2023

(51) Int. Cl.
| | | |
|---|---|---|
| *A01C 7/08* | (2006.01) | |
| *A01C 15/00* | (2006.01) | |
| *A01C 15/04* | (2006.01) | |
| *A01C 21/00* | (2006.01) | |
| *B65G 53/66* | (2006.01) | |
| *F04D 15/00* | (2006.01) | |
| *F04D 15/02* | (2006.01) | |
| *G05D 1/00* | (2006.01) | |

(52) U.S. Cl.
CPC ............ *B65G 53/66* (2013.01); *A01C 15/006* (2013.01); *A01C 15/04* (2013.01); *A01C 21/005* (2013.01); *F04D 15/0066* (2013.01); *F04D 15/02* (2013.01); *A01C 7/081* (2013.01); *G05D 1/0219* (2013.01)

(58) Field of Classification Search
None
See application file for complete search history.

(56) References Cited

U.S. PATENT DOCUMENTS

| | | | | |
|---|---|---|---|---|
| 6,192,813 B1 * | 2/2001 | Memory | ............... | A01C 7/081 |
| | | | | 340/684 |
| 6,296,425 B1 * | 10/2001 | Memory | ............... | G01F 1/7086 |
| | | | | 406/197 |
| 6,584,920 B1 | 7/2003 | Cresswell | | |
| 8,010,262 B2 | 8/2011 | Schroeder et al. | | |
| 8,281,725 B2 | 10/2012 | Wendte et al. | | |
| 8,522,700 B2 | 9/2013 | Landphair | | |

(Continued)

FOREIGN PATENT DOCUMENTS

DE        4308125 A1      9/1994

OTHER PUBLICATIONS

Air Seeder Fans, Bourgault North America, Accessed Oct. 14, 2021, pp. 1-2, https://www.bourgault.com/Specification/tabid/254/language/en-US/Default.aspx?DocId=770.

(Continued)

*Primary Examiner* — Joseph A Dillon, Jr.
(74) *Attorney, Agent, or Firm* — Rebecca L. Henkel; Peter K. Zacharias; Rickard K. DeMille (57) ABSTRACT

A system for automatically controlling air flow rate within an agricultural system is provided. One system for distributing an agricultural product includes a metering system configured to meter the agricultural product from a storage tank into a conduit. The system includes an air conveyance system to provide an air stream for moving metered agricultural product in the conduit toward a distribution device. The air conveyance system comprises one or more sensors to monitor the product status and/or the air stream inside the conduit. The system also includes control circuitry configured to control air flow rate based on the product status and/or the air stream inside the conduit and/or the geographic location of the system.

16 Claims, 4 Drawing Sheets

(56) References Cited

U.S. PATENT DOCUMENTS

| | | | |
|---|---|---|---|
| RE45,091 E | 8/2014 | Bassett | |
| 8,893,630 B2* | 11/2014 | Kowalchuk | A01C 7/102 |
| | | | 111/174 |
| 8,903,545 B2 | 12/2014 | Riffel et al. | |
| 8,909,435 B2 | 12/2014 | Tuttle et al. | |
| 8,920,078 B2 | 12/2014 | Woolever | |
| 8,942,860 B2* | 1/2015 | Morselli | G05D 1/0293 |
| | | | 701/1 |
| 8,948,980 B2 | 2/2015 | Gamer et al. | |
| 9,113,591 B2* | 8/2015 | Shivak | A01C 7/082 |
| 9,144,190 B2 | 9/2015 | Henry et al. | |
| 9,179,594 B2 | 11/2015 | Graham | |
| 9,271,439 B2 | 3/2016 | Bourgault et al. | |
| 9,585,305 B2* | 3/2017 | Henry | A01C 7/127 |
| 10,152,891 B2* | 12/2018 | Rusciolelli | A01B 69/008 |
| 10,194,579 B2* | 2/2019 | Henry | B05B 12/006 |
| 10,314,224 B2* | 6/2019 | Turpin | G06Q 50/02 |
| 10,394,238 B2* | 8/2019 | Foster | G05D 1/0217 |
| 10,448,562 B2* | 10/2019 | Henry | A01C 7/102 |
| 10,459,447 B2* | 10/2019 | Foster | A01B 69/008 |
| 10,588,259 B2* | 3/2020 | Isaac | A01D 41/1243 |
| 10,729,055 B2* | 8/2020 | Foster | A01B 69/008 |
| 10,986,768 B2* | 4/2021 | Engel | A01C 21/005 |
| 11,006,564 B2* | 5/2021 | Foster | G05D 1/0217 |
| 11,134,602 B2* | 10/2021 | Stanhope | A01B 59/041 |
| 11,185,004 B2* | 11/2021 | Boydens | A01B 69/008 |
| 11,343,959 B2* | 5/2022 | Graham | A01C 7/102 |
| 11,740,632 B2* | 8/2023 | Boydens | G05D 1/0088 |
| | | | 701/25 |
| 11,744,169 B2* | 9/2023 | Pridmore | A01C 21/00 |
| | | | 701/50 |
| 2020/0037491 A1* | 2/2020 | Schoeny | A01C 21/007 |
| 2021/0127556 A1* | 5/2021 | Graham | A01C 7/082 |
| 2021/0386009 A1* | 12/2021 | Engel | A01C 7/084 |
| 2022/0124957 A1* | 4/2022 | Singh | A01B 79/005 |
| 2023/0225246 A1* | 7/2023 | Leenknegt | A01D 41/1243 |
| | | | 460/1 |

OTHER PUBLICATIONS

Mitchell Equipment, Jump Start Guide, Case Agriculture, 2018 edition, pp. 1-60, https://www.mitchellequip.com/wp-content/uploads/2020/12/2018-planter-guide.pdf.

* cited by examiner

AUTOMATIC HEADLAND FAN CONTROL

BACKGROUND

The present disclosure relates generally to agricultural metering systems and, more particularly, to a system and method for automatically controlling air flow to an agricultural metering system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an agricultural system is used to meter and deliver agricultural product (e.g., seeds, fertilizer) to ground engaging tools within the seeding implement. Certain agricultural system include a metering system and an air conveyance system configured to deliver metered quantities of product into an airflow that transfers the product to the openers. However, typical air conveyance systems have limited ability to regulate air flow based on one or more factors, such as product flow rate from the metering system. For example, in certain air conveyance systems, the fan speed is manually set by an operator. In such configurations, the fan remains at a fixed fan speed unless adjusted by the operator. The fixed fan speed may provide an insufficient air flow to the metering system, thereby increasing the possibility of blockage formation within product distribution hoses. Alternatively, the fixed fan speed may provide an excessive air flow to the metering system, thereby increasing the possibility of product being blown out of a seeding trench and/or causing damage to the seed.

Moreover, certain metering systems include multiple independently controllable metering sections configured to selectively route product to various openers. In such metering systems, the flow rate of product into the airflow is dependent upon the number of metering sections in operation. In such systems, the air conveyance system is configured to provide a sufficient airflow to ensure that product is effectively transferred to the openers when all metering sections are in operation. Unfortunately, because the air conveyance system has a limited ability to regulate airflow, an extraneous airflow will be provided when less than all of the metering sections are in operation, thereby reducing the efficiency of the agricultural system. Indeed, because the air conveyance system has a limited ability to regulate airflow, an extraneous airflow may be provided in various other circumstances, thereby reducing the efficiency of the agricultural system.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system configured to distribute an agricultural product in a field includes a metering system configured to meter the agricultural product from a storage tank. The agricultural system also includes an air conveyance system having a fan configured to produce an air stream in the conduit to move the agricultural product through the conduit toward a distribution device. The agricultural system also includes one or more sensors positioned along the conduit to measure one or more parameters of the agricultural product in the conduit, the air stream in the conduit, or both. The agricultural system also includes control circuitry configured to control operation of the fan based upon the one or more parameters.

In certain embodiments, an agricultural system configured to distribute an agricultural product in a field includes a metering system configured to meter the agricultural product from a storage tank into a conduit. The agricultural system also includes an air conveyance system having a fan configured to produce an air stream in the conduit to move the agricultural product through the conduit toward a distribution device. The agricultural system also includes one or more sensors configured to monitor one or more parameters indicative of a lack of the agricultural product in the conduit. The agricultural system also includes control circuitry configured to receive a prescription rate map of the field, monitor a location of the agricultural system in the field, control the metering system to block flow of the agricultural product from the storage tank to the conduit as the agricultural system approaches a headlands portion of the field, and control the fan to reduce a speed of the fan in response to the agricultural system approaching or being in the headlands portion of the field and sensor data from the one or more sensors indicating the lack of the agricultural product in the conduit.

In certain embodiments, an agricultural system configured to distribute an agricultural product in a field includes a metering system configured to meter the agricultural product from a storage tank into a conduit. The agricultural system also includes an air conveyance system having a fan configured to produce an air stream in the conduit to move the agricultural product through the conduit. The agricultural system also includes control circuitry configured to receive a first indication of a current application rate of the agricultural product to the field, receive a second indication of a type of the agricultural product, and determine a delay time between shut off of the metering system and clean out of the conduit based at least in part on the current application rate and the type of the agricultural product. The control circuitry is also configured to control operation of the fan to reduce a speed of the fan after the shut off of the metering system based on the delay time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
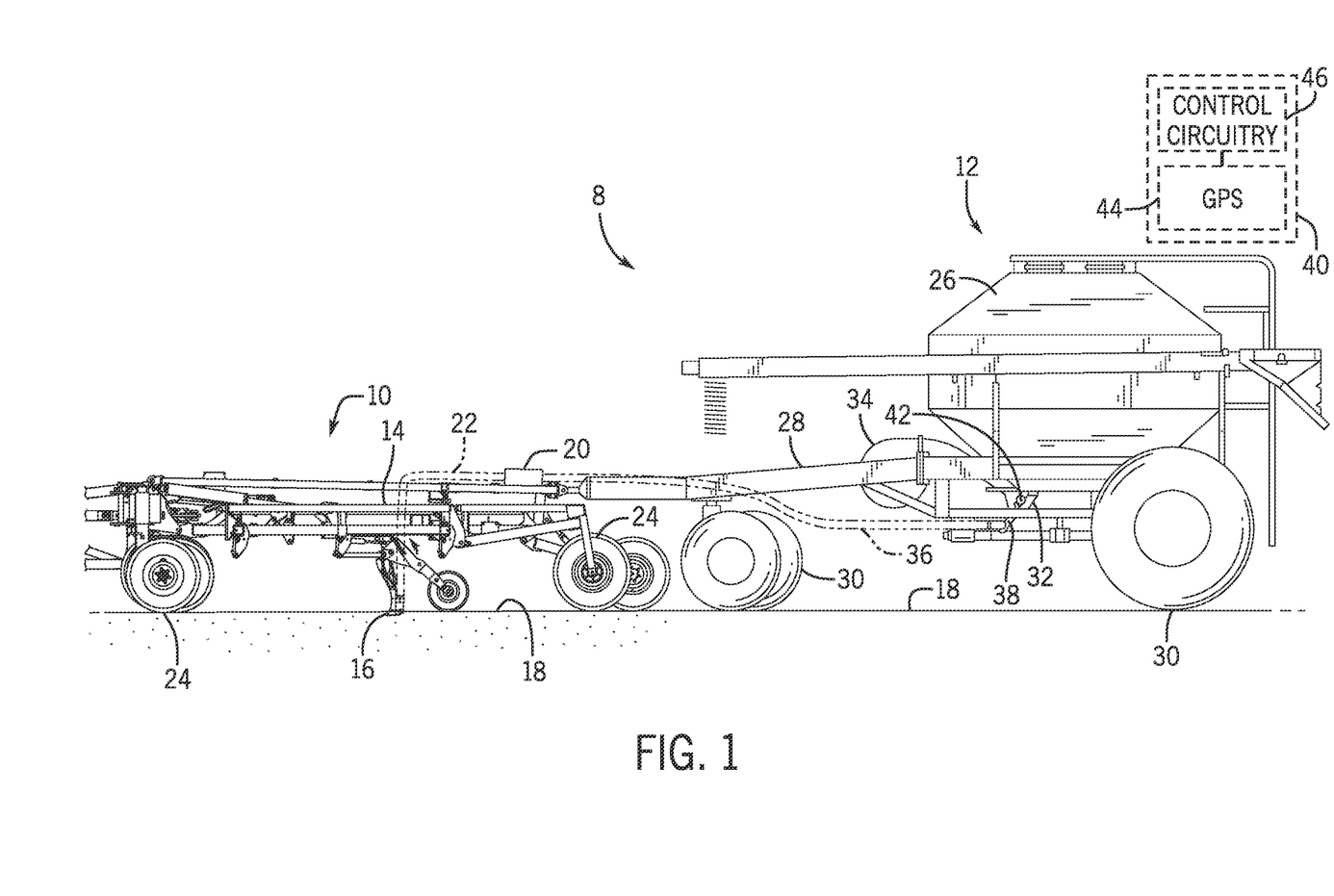
FIG. 1 is a schematic diagram of an embodiment of an agricultural system configured to distribute agricultural product in a field.
Figure 3:
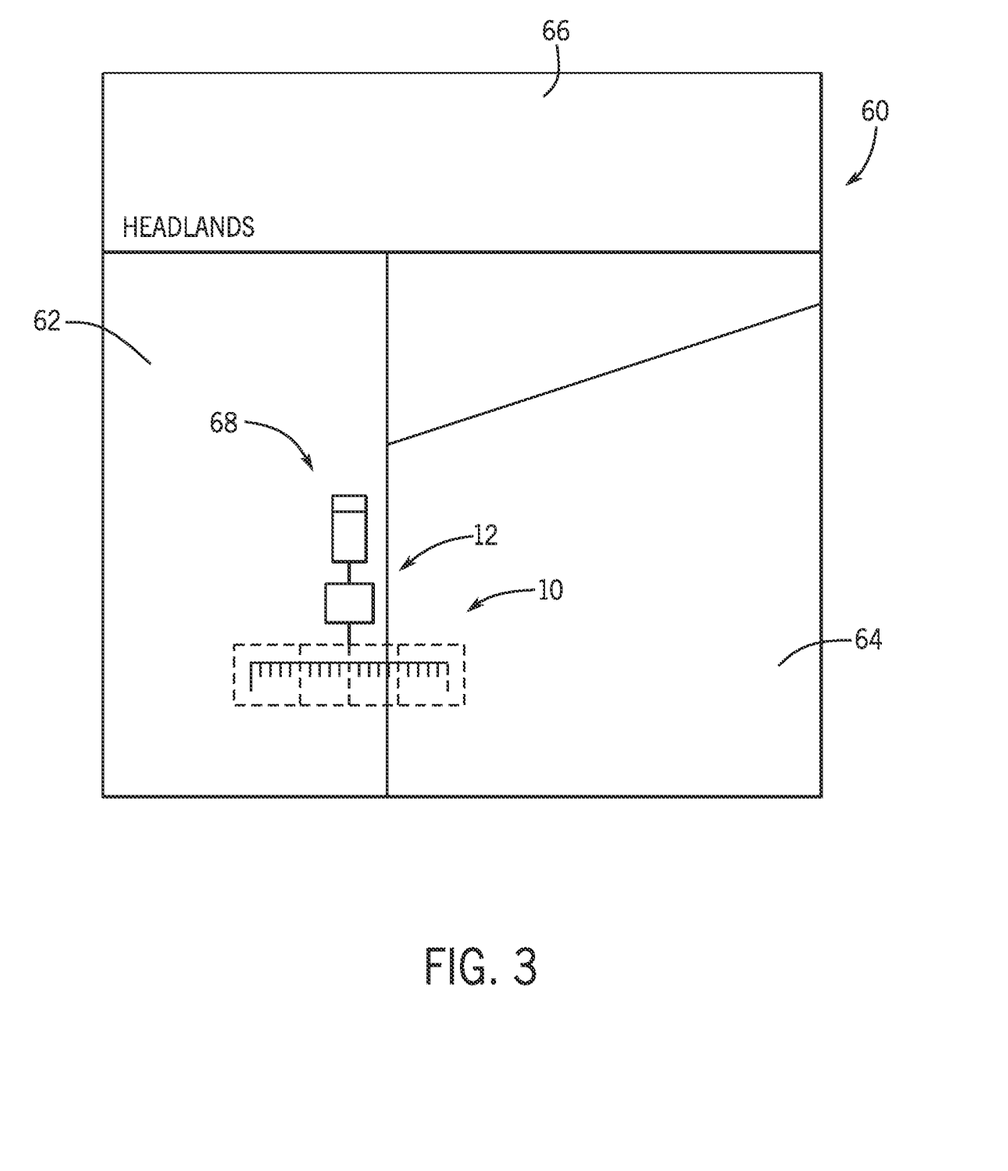
FIG. 3 is a schematic diagram of an embodiment of the agricultural system of FIG. 1 traveling through the field with a headlands section.

FIG. 1 is a side view of an embodiment of an agricultural system 8. In the illustrated embodiment, an implement 10 is coupled to an air cart 12, which is towed behind the implement 10 during operation and transport. The implement 10 includes a tool frame 14 and a ground engaging tool 16 (e.g., opener; distribution device) coupled to the tool frame 14. The ground engaging tool 16 is configured to excavate a trench into the soil 18 to facilitate seed and/or fertilizer deposition. In the illustrated embodiment, the ground engaging tool 16 receives product (e.g., seed, fertilizer) from a product distribution header 20 via a hose 22 extending between the header 20 and the ground engaging tool 16. Although only one ground engaging tool 16, product distribution header 20, and hose 22 are shown in FIG. 1, it should be appreciated that the implement 10 may include additional tools 16, headers 20 and/or hoses 22 to facilitate product delivery across a wide swath of soil 18. In addition, the implement 10 includes wheel assemblies 24 that contact the soil surface 18 and enable the implement 10 to be pulled by a tow vehicle (e.g., tractor). While the air cart 12 is towed behind the implement 10 in the illustrated embodiment, it should be appreciated that the air cart 12 may be towed directly behind a tow vehicle in alternative embodiments. For example, as shown in FIG. 3, the air cart 12 may be coupled to the tow vehicle by a hitch assembly, and the implement 10 may be towed behind the air cart 12. In further embodiments, the implement 10 and the air cart 12 may be part of a single unit that is towed behind a tow vehicle, or the implement 10 and the air cart 12 may be elements of a self-propelled vehicle configured to distribute product across a field.

In the illustrated embodiment, the air cart 12 includes a storage tank 26, a frame 28, wheels 30, a metering system 32, and an air source 34 (such as a blower). The frame 28 includes a towing hitch configured to couple to the implement 10 or tow vehicle, thereby enabling the air cart 12 to be towed across a field. In certain configurations, the storage tank 26 includes multiple compartments for storing various flowable particulate materials. For example, one compartment may include seeds, and another compartment may include a dry/granular fertilizer. In such configurations, the air cart 12 may be configured to deliver both seed and fertilizer to the implement 10 via separate distribution systems, or as a mixture through a single distribution system.

The seed and/or fertilizer within the storage tank 26 are gravity fed into the metering system 32, thereby enabling the metering system 32 to distribute a desired quantity of product to the ground engaging tools 16 of the implement 10. In the present embodiment, the metering system 32 includes sectioned meter rollers to regulate the flow of product from the storage tank 26 into an air flow provided by the air source 34. The air flow then carries the product to a hose 36 through a conduit 38, and then to the implement 10, thereby supplying the ground engaging tools 16 with seed and/or fertilizer for deposition into the soil. Although only one hose 36 is shown in FIG. 1, additional hoses may be may be employed in alternative embodiments to transfer product from the air cart 12 to various distribution headers 20 of the implement 10.

It is presently recognized that it may be desirable to control the metering system 32 and the air source 34 to regulate a flow of product from the storage tank 26 to the implement 10. In particular, it is presently recognized that it may be desirable to control the metering system 32 and the air source 34 to regulate the flow of product based on various factors, such as a position of the implement 10 in the field (e.g., to follow a prescription rate map; to slow or to stop in a headlands sections of the field), based on an amount of product in the storage tank 26, and/or based on an amount of product in the product distribution lines 22, 36, 38. Accordingly, a control assembly 40 (e.g., electronic control assembly) may be communicatively coupled to the metering system 32 and the air source 34 to regulate the flow of product from the storage tank 26 and the air flow from the air source 34 to carry the flow of product to the implement 10.

In some embodiments, the control assembly 40 may include or be communicatively coupled to one or more sensors 42 (e.g., an air velocity sensor, a product flow sensor, a pressure sensor, an optical sensor, a motion sensor, a sound sensor, or any combination thereof) installed to measure one or more parameters (e.g., product flow rate, weight, type, air velocity) of the agricultural product, or the air stream, or both in the conduit 38 and/or other product distribution lines 22, 36. The control assembly 40 may include or be communicatively coupled to a position sensing device 44, such as a Global Positioning System (GPS) receiver. In such configurations, a control circuitry 46 (e.g., electronic control circuitry) of the control assembly 40 may receive geographical position information from the GPS receiver, thereby facilitating position determination of the air cart 12 and/or the implement 10. As such, the control assembly 40 may implement "Smart Farming" whereby the metering system 32 and the air source 34 are controlled based on the geographical position of the air cart 12 and/or the implement 10. Further, the control assembly 40 may receive an indication of and monitor a ground speed measured by a ground speed sensor, which may be located in the air cart 12, the implement 10, or the tow vehicle. As may be appreciated, the metering system 32 may be controlled (e.g., to meter the agricultural product from the storage tank 36 at a desired product flow rate) and/or the air source 34 may be controlled (e.g., to provide the air flow at a desired air flow rate) based on the one or more parameters of the agricultural product in the product distribution lines 22, 36, 38, the desired product flow rate, a prescribed rate map for the field, and/or the geographic position of the air cart 12 and/or the implement 10 in the field, and/or the ground speed (e.g., of the air cart 12 and/or the implement 10 in the field).

Figure 2:
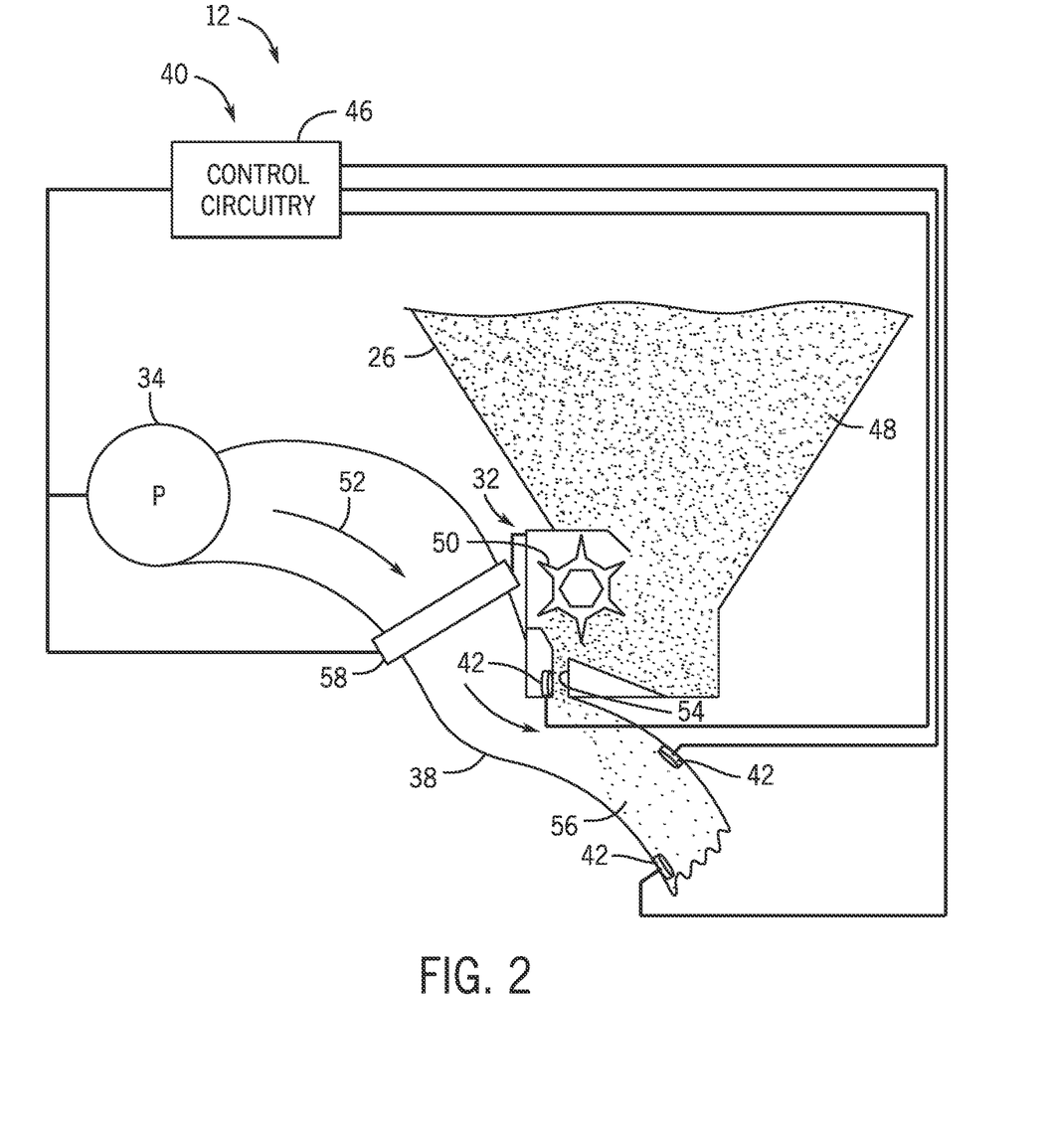
FIG. 2 is a side view of an embodiment of an air cart that may be used in the agricultural system of FIG. 1, wherein the air cart includes a storage tank, a metering system, an air conveyance system, and sensors.

More particularly, the control assembly 40 is configured to determine the desired air flow rate to provide sufficient air flow to substantially reduce the possibility of blockage formation within the product distribution lines 22, 36, 38, as well as to provide proper distribution of the agricultural product as the agricultural system 8 travels through the field (e.g., according to the prescription rate map). Additionally, the control assembly 40 is configured to determine the desired air flow rate to substantially reduce the possibility of product being blown out of a seeding trench, as well as to reduce inefficiencies and/or wear on components under certain circumstances. For example, the control assembly 40 may determine that the desired air flow rate should be reduced (e.g., to a non-zero air flow rate) and/or stopped (e.g., to zero) while the one or more parameters indicate that there is no product in the product distribution lines 22, 36, 38 and/or while the implement 10 is in a headlands section of the field (or other section that is prescribed to have no product distribution or later product distribution). Accordingly, the control assembly 40 may control the air source 34 to reduce and/or stop the air flow in such circumstances. In some embodiments, the sensors 42 may monitor the actual air flow rate in the conduit 38. The control circuitry 46 may then control the air source 34 and/or other devices (e.g. a damper 58, which is shown in FIG. 2) to adjust the actual air flow rate in the conduit 38 to substantially correspond to the desired air flow rate (e.g., as part of a feedback loop).

In some embodiments, the control circuitry 46 may reduce or stop the air stream in the conduit 38 each time the implement 10 approaches and/or travels through the headlands section. The control circuitry 46 may carry out an automated process, such as calculating a drive time until the implement 10 will enter the headlands section based on the geographic position and the ground speed. Then, the control circuitry 46 may reference a first delay time (e.g., product delay time; represents an expected time for the product to travel from the metering system 32 to the ground engaging tool 16). Then, the control circuitry 46 may shut off the metering system 32 based on the drive time and the first delay time. For example, the control circuitry 46 may shut off the metering system 32 when the drive time corresponds to or matches the first delay time (e.g., the implement 10 will enter the headlands section in about 5 seconds, and the first delay time is about 5 seconds). In some embodiments, the first delay time has a fixed duration that is set at manufacturing or selected by the operator. In some embodiments, the control circuitry 46 may dynamically calculate the first delay time based on a current product application rate, a product type, environmental conditions, or the like.

In any case, the control circuitry 46 reduces and/or stops the air stream in coordination with the shut off of the metering system 32. For example, the control circuitry 46 may reference a second delay time (e.g., air stream delay time; clean out time; represents an expected time for the air stream to clear out any remaining product between the metering system 32 and the ground engaging tool 16 after the shut off of the metering system 32). Then, the control circuitry 46 may reduce and/or stop the air stream based on the drive time, the first delay time, and/or the second delay time. For example, if the first delay time is 5 seconds, the second delay time may be 10 seconds to enable the air stream to continue to carry the product throughout the first delay time (e.g., at the prescribed rate) and subsequently to clear out any remaining product (e.g., not necessarily at any prescribed rate). In some embodiments, the second delay time has a fixed duration that is set at manufacturing or selected by the operator. In some embodiments, the control circuitry 46 may dynamically calculate the second delay time based on the first delay time, the current product application rate, the product type, the environmental conditions, or the like.

In some embodiments, the control circuitry 46 may carry out the automated process based on the prescription rate maps, the geographic position, the ground speed, and the delay times. In some embodiments, the control circuitry 46 may receive and consider an on/off status of the metering system 32 to carry out the automated process. Additionally or alternatively, in some embodiments, the control circuitry 46 may consider the one or more parameters indicated by the data from the one or more sensors 42 in order to carry out the automated process. It should appreciated that use of the one or more sensors 42 is optional, and the control circuitry 46 may not consider the one or more parameters indicated by the data from the one or more sensors 42 in order to carry out the automated process. More particularly, the control circuitry 46 may determine the one or more parameters based on the data from the one or more sensors 42 and then control the air source 34 based on the one or more parameters.

For example, the control circuitry 46 may determine the product flow rate of the product based on the data from the one or more sensors 42 located along any suitable portion of the product distribution line 22, 36, 38. The control circuitry 46 may compare the product flow rate to a threshold, which may be zero or a non-zero flow rate, and the control circuitry 46 may reduce the air stream and/or turn off the air source 34 in response to (e.g., only if or only after) the product flow rate being at or below the threshold. In some embodiments, the control circuitry 46 may reduce the air stream and/or turn off the air source 34 in response to the product flow rate being at or below the threshold for a threshold period of time (e.g., more than 2, 3, 4, 5, or 10 seconds). In some embodiments, the control circuitry 46 may monitor a trend in the product flow rate over time, such as after shutting off the metering system 32. Then, the control circuitry 46 may reduce the air stream and/or turn off the air source 34 in response to the trend in the product flow rate over time matching an expected trend, as this indicates that the product is traveling through the agricultural system 8 in an expected manner. For example, the control circuitry 46 may reduce the air stream and/or turn off the air source 34 when the product flow rate reaches the threshold (e.g., zero or non-zero) and the trend in the product flow rate over time (e.g., since turning off the metering system 32) matches the expected trend. In this way, the control circuitry 46 may control the air source 34 in a dynamic manner to cause the air flow to carry the product at the prescription rate, clean any remaining product from the product distribution lines 22, 36, 38, and also operate efficiently at low or zero fan speeds when appropriate.

As another example, the control circuitry 46 may determine the air velocity of the air stream based on the data from the one or more sensors 42 located along any suitable portion of the product distribution line 22, 36, 38. The air velocity generally increases as the product distribution line 22, 36, 38 cleans out (e.g., as the product decreases). Thus, the control circuitry 46 may compare the air velocity to a threshold, which may be zero or a non-zero air velocity, and the control circuitry 46 may reduce the air stream and/or turn off the air source 34 in response to (e.g., only if or only after) the air velocity being at or below the threshold. In some embodiments, the control circuitry 46 may reduce the air stream and/or turn off the air source 34 in response to the air velocity being above the threshold for a threshold period of time (e.g., more than 2, 3, 4, 5, or 10 seconds). In some embodiments, the control circuitry 46 may monitor a trend in the air velocity over time, such as after shutting off the metering system 32.

Then, the control circuitry 46 may reduce the air stream and/or turn off the air source 34 in response to the trend in the air velocity over time matching an expected trend, as this indicates that the product and the air stream are traveling through the agricultural system 8 in an expected manner. For example, the control circuitry 46 may reduce the air stream and/or turn off the air source 34 when the air velocity reaches the threshold (e.g., zero or non-zero) and the trend in the air velocity over time (e.g., since turning off the metering system 32) matches the expected trend. In this way, the control circuitry 46 may control the air source 34 in a dynamic manner to cause the air flow to carry the product at the prescription rate, clean any remaining product from the product distribution lines 22, 36, 38, and also operate efficiently at low or zero fan speeds when appropriate.

It should be appreciated that the control circuitry 46 may additionally or alternatively determine the pressure in the product distribution line 22, 36, 38 based on the data from the one or more sensors. The pressure generally decreases as the product distribution line 22, 36, 38 cleans out (e.g., as the product decreases). Thus, the control circuitry 46 may compare the pressure (or a pressure drop across a fixed distance in the product distribution line 22, 36, 38) to a threshold, which may be zero or a non-zero pressure, and the control circuitry 46 may reduce the air stream and/or turn off the air source 34 in response to (e.g., only if or only after) the pressure being at or below the threshold. In some embodiments, the control circuitry 46 may reduce the air stream and/or turn off the air source 34 in response to the pressure being at or below the threshold for a threshold period of time (e.g., more than 2, 3, 4, 5, or 10 seconds). In some embodiments, the control circuitry 46 may monitor a trend in the pressure over time, such as after shutting off the metering system 32. Then, the control circuitry 46 may reduce the air stream and/or turn off the air source 34 in response to the trend in the pressure over time matching an expected trend, as this indicates that the product is traveling through the agricultural system 8 in an expected manner. For example, the control circuitry 46 may reduce the air stream and/or turn off the air source 34 when the pressure reaches the threshold (e.g., zero or non-zero) and the trend in the pressure over time (e.g., since turning off the metering system 32) matches the expected trend. In this way, the control circuitry 46 may control the air source 34 in a dynamic manner to cause the air flow to carry the product at the prescription rate, clean any remaining product from the product distribution lines 22, 36, 38, and also operate efficiently at low or zero fan speeds when appropriate. The sensors 42 may include optical sensors, acoustic sensors, pressure sensors (e.g., diaphragm or capacitance pressure transducers), or any other suitable type of sensors that are capable of detecting a presence of product, a flow rate of product, a flow rate of the air stream, a pressure, or the like. It should also be appreciated that any types of sensors and parameters may be considered together (e.g., two or more different parameters reach respective thresholds before controlling the air source 34).

The control circuitry 46 may provide control signals to raise the ground engaging tool 16 in coordination with the shut off of the metering system 32 and/or the adjustment to the air stream (e.g., after the first delay time; through the headlands section). In some embodiments, the control circuitry 46 may reduce or stop the air stream after raising the ground engaging tool 16 away from the field. However, in some embodiments, the control circuitry 46 may reduce or stop the air stream prior to, or at the same time as, raising the ground engaging tool 16 away from the field. Specifically, in certain embodiments, the air source 34 may be a blower having a hydraulically controlled fan. Reducing the fan speed (e.g., to a non-zero fan speed) or shutting off the fan (e.g., reducing the fan speed to zero) may save the hydraulic fluid provided to the fan, and thereby enable the ground engaging tool 16 to be raised faster as more hydraulic liquid or higher pressure of hydraulic liquid may be provided to the ground engaging tool 16.

The techniques disclosed herein may result in a reduced or no air stream while the implement 10 travels through the headlands section (or other sections that are not to receive the product during a current pass), which may save the hydraulic fluid provide to the air source 34, reduce wear on the air source 34, and/or provide other advantages. The steps to shut off the air source 34 and/or to reduce or stop the air stream may be reversed to enable the implement 10 to distribute the product as the implement 10 passes out of the headlands section and into an unplanted section of the field (e.g., the air source 34 may be controlled to provide the air stream at the desired air flow rate, then the metering system 32 may be controlled to meter the product into the air stream such that the product is released from the ground engaging tool 16 once the ground engaging tool 16 enters the unplanted section of the field).

It should be appreciated that the control circuitry 46 may include a memory and a processor (e.g., a microprocessor). The control circuitry 46 may also include one or more storage devices and/or other suitable components. The processor may be used to execute software, such as software for processing data from the sensors 42, calculating delay times, calculating desired fan speeds, or the like. Because the control circuitry may control various components of the agricultural system 8, the control circuitry 46 may be considered to be part of and/or may include hardware located on the agricultural system 8, the implement 10, the air cart 12, the tow vehicle or other machine.

Moreover, the processor may include multiple microprocessors, one or more “general-purpose” microprocessors, one or more special-purpose microprocessors, and/or one or more application specific integrated circuits (ASICS), or some combination thereof. For example, the processor may include one or more reduced instruction set (RISC) or complex instruction set (CISC) processors. The memory may include a volatile memory, such as random access memory (RAM), and/or a nonvolatile memory, such as read-only memory (ROM). The memory may store a variety of information and may be used for various purposes. For example, the memory may store processor-executable instructions (e.g., firmware or software) for the processor to execute.

FIG. 2 is a schematic diagram of an embodiment of the air cart 12 with the air source 34. For purposes of discussion, the air source 34, the conduit 38, and certain other components may be considered to form an air conveyance system for the air cart 12. . As illustrated, the air source 34 is coupled to the conduit 38 that is configured to flow air past the metering system 32. In other embodiments, the conduit may include multiple conduit sections with one conduit section coupling the air source to the top of the metering system and another conduit section coupling the bottom of the metering system to the implement. In such a configuration, air flows through the metering system, from top to bottom. The air enters the metering system, combines with the metered product, and exits the metering system as a mixture of product and air.

The air source 34 may be a pump or blower powered by an electric or hydraulic motor, for example. Specifically, in certain embodiments, the air source 34 may be a blower having a hydraulically controlled fan. Flowable particulate material 48 (e.g., seeds, fertilizer) within the storage tank 26 flows by gravity into the metering system 32. The metering system 32 includes one or more meter rollers 50 configured to regulate the flow of product into an air stream 52. In certain embodiments, the metering system 32 may include multiple meter rollers 50 disposed adjacent to one another along a longitudinal axis of the rollers 50. In other embodiments, the meter rollers 50 may be positioned so their rotational axes are parallel to one another. For example, certain metering systems 32 include eight meter rollers 50 arrange in a linear configuration. Such systems 32 are known as "8-run" metering assemblies. However, alternative embodiments may include more or fewer meter rollers, e.g., 5, 6, 7, 8, 9, or more.

For a particular meter roller configuration, the rotation rate of the meter roller 50 controls the flow of material 48 into the air stream 52. Specifically, as the meter roller 50 rotates, material is transferred through an opening 54 in the metering system 32 into the conduit 38. The opening 54 may be blocked to block flow of the agricultural product from the storage tank 26 to the conduit 38. For example, when the agricultural system approaches a headlands portion of the field, the control circuitry 46 may control the metering system 32 to block flow of the agricultural product from the storage tank 26 to the conduit 38. The material then mixes with air from the air source 34, thereby forming an air/material mixture 56. The mixture 56 then flows to the row units of the implement 10 via the pneumatic conduits, where the seeds and/or fertilizer are deposited within the soil. The rate that the product flows through the conduit 38 is generally controlled by the air source 34. Specifically, the air source 34 may adjust the flow rate of the air stream 52 to effectively and reliably carry the air/material mixture 56 through the product distribution lines. A desirable fan speed of the air source 34 and the flow rate of the air stream 52 may vary based on numerous factors, such as product type, application rate, ground speed, and the like. For example, in applications where the air cart 12 increases speed, it may be desirable to increase the flow rate of the air/material mixture 56 being delivered to the implement 10 to match a particular prescription rate for the field. As another example, in applications where the product flow rate decreases, it may be desirable to decrease the flow rate of the air/material mixture 56 being delivered to the implement 10 to match the particular prescription rate for the field.

In some embodiments, the control assembly 40 may include a damper (or a valve) 58. The air stream 52 can be further controlled by the damper 58. The damper 58 may conduct further adjusting of the air stream 52 in addition to the air source 34 controlling the air stream 52. In certain embodiments, there might be more than one metering systems 32 coupled to one air source 34, or one metering system 32 coupled to more than one air source 34. In these embodiments, the damper 58 may be used to adjust the air stream 52 for a particular conduit 38 (e.g., only one conduit 38 of many conduits 38). As mentioned above, the control circuitry 46 may control the air source 34 and/or the damper 58 to adjust the actual air flow rate in the conduit 38 to substantially correspond to the desired air flow rate. For example, when the implement 10 approaches or is in the headlands where there is no prescription for seed distribution during a current pass, the desired air flow rate in the conduit 38 may be very small or completely zero. It should be appreciated that the air source 34 and/or the damper 58 may be controlled to adjust the air stream 52 in any manner set forth herein, such as based on the delay rates and/or data from the one or more sensors 42.

In some embodiments, a hydraulics controller may receive a signal from the control circuitry 46 indicating an operating mode of the air source 34. The hydraulics controller may use the signal to control the air source 34 (e.g., the flow rate from the air source 34) to operate at the operating mode by adjusting the speed of the fan motor of the air source 34. The hydraulics controller may instruct a flow control device (e.g., a hydraulic valve or fan pump) to control the hydraulic fluid provided to the air source 34 to control its fan motor speed based on the operating mode. A speed of the fan motor is based on the pressure and/or the flow rate of the hydraulic fluid flowing to the fan motor. For example, as the pressure and/or flow rate of the hydraulic fluid increases, the speed of the fan motor may increase. Conversely, as the pressure and/or flow rate of the hydraulic fluid decreases, the speed of the fan motor may decrease.

FIG. 3 is a schematic diagram of an embodiment of the agricultural implement 10 and the air cart 12 being towed through a field 60. For purposes of discussion, the field 60 is shown overlaid with a prescription rate map, which is indicative of different prescribed product application rates for various regions of the field. For example, the prescription rate map indicates a first prescribed product application rate for a first region 62 of the field 60, a second prescribed product application rate for a second region 64 of the field 60, and/or a third prescribed product application rate for a third region 66 of the field 60. The third region 66 may be referred to herein as the headlands region, which is a region defined near a boundary of the field 60 (e.g., opposite ends of the field 60) to allow the agricultural system to make a 180 degree turn between passes across the field 60. The headlands region may not be seeded until an end of the seeding operations (e.g., after all of the other regions in the field 60) to avoid disturbing the agricultural product in the headlands region as the agricultural system makes the 180 degree turns between the passes across the field 60. However, in some embodiments, the third region 66 may be any region of the field 60 or any other area traveled by the agricultural system that has no agricultural product prescribed or set for at least a current pass and/or over which it may be desirable to delay the seeding operations, for example. In any case, the ground engaging tools may be lifted, the metering system 32 may be shut off, and/or the air source may be adjusted (e.g., reduced or shut off) in the third region 66 of the field 60, as described herein. Additionally, as noted above, in certain embodiments, the prescription rate map may be provided to the control circuitry.

As the implement 10 is towed through the field 60 by a tow vehicle 68 (e.g., tractor), the control circuitry may also receive location information from the GPS sensor. Based on the prescription rate map, the control circuitry may determine an appropriate metering rate for each metering sections in the metering system (in certain embodiments, there may be only one metering section) and/or a desired air flow rate for the air stream from the air source. Additionally, the control circuitry may independently adjust each metering section to the appropriate metering rate and/or the desired air flow rate for the air stream from the air source 34 to output the agricultural product at the various prescribed rates to each region of the field 60 via respective sections of the implement 10. As noted above, the control circuitry may receive signals indicative of the ground speed of the implement 10, the geographic position of each metering section in the field, delay times, and/or the product status in the conduit for each metering section, and may utilize such signals and/or data to adjust each metering section and/or the air source.

The control circuitry may use the prescription rate map, data from the sensors, the geographic position, the ground speed, and/or the delay times to carry out a coordinated and automated process to shut off the metering system and to reduce or to stop the air stream from the air source as the implement 10 approaches, crosses into, and/or travels through the headlands region 66 (or other region of the field 60 that is prescribed to have no product or will be seeded in subsequent passes). More particularly, the control circuitry may control the metering system based on the first delay time that relates to a time for the product to travel from the metering system to the ground engaging tool of the implement 10 and/or control the air source based on the second delay time that relates to an additional time that enables the air stream from the air source to clean out the product distribution lines.

As another example, the air source may be controlled to provide the air stream to deliver all of the product metered by the metering system through the product distribution lines. This may be accomplished using the data from sensors, as the data may indicate that it takes approximately 5 to 10 seconds to clean out the product from the product distribution lines after shutting down the metering system. It should be appreciated that the time to clean out the product from the product distribution line may vary with one or more factors, including a current application rate. Furthermore, the one or more sensors may detect and/or confirm the current application rate, and the control circuitry may adjust the time accordingly. Then, the control circuitry may collect and analyze the data over time to set the second delay time for the air source, and then control the air source to reduce or to stop the air stream according to the second delay time. In this way, the control circuitry may dynamically establish the second delay time for each air source or each air cart.

As set forth herein, the air source may be controlled to reduce the air flow rate or completely stop based on the geographic position of the implement 10 relative to the headlands region 66. Thus, the air source may be controlled to reduce or to stop the air stream while the implement 10 is within the headlands region 66 or as the implement 10 crosses into or approaches the headlands region 66 (e.g., within 2, 5, or 10 seconds). Furthermore, the air source may be controlled to turn on or increase the air stream while the implement 10 is outside of the headlands regions 66 (or is in any regions with a prescribed product rate) or as the implement 10 crosses out of or approaches a boundary to reenter the field with a prescribed product rate. It may be desirable to coordinate operation and control of the metering system 32 and the air source 34; however, the air source 34 may be controlled independently of the metering system 32 (e.g., based on the geographic location and/or the ground speed, such as any time the implement is in or approaching the headlands regions 66).

Figure 4:
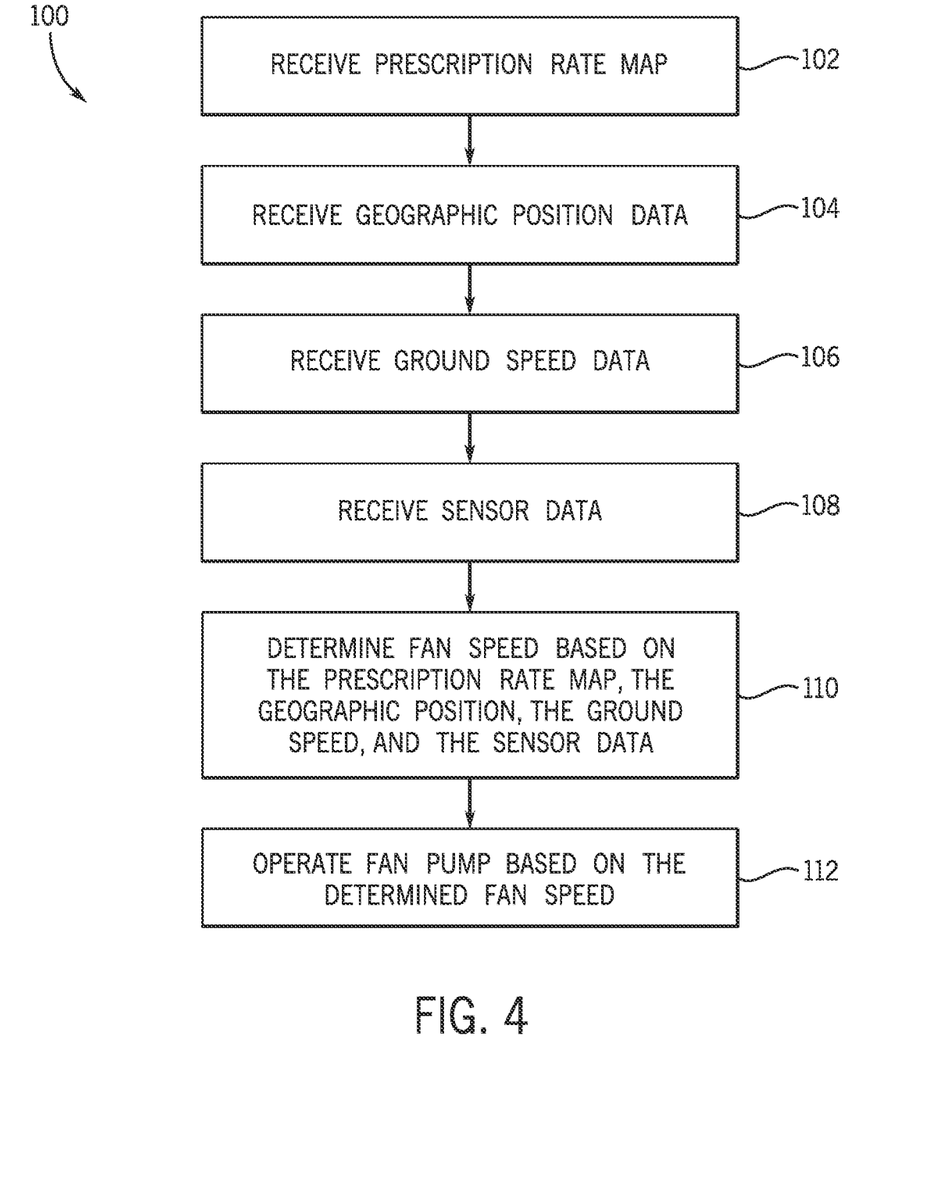
FIG. 4 is a flow diagram of an embodiment of a method of automatically adjusting a fan speed in an air conveyance system that may be used in the agricultural system of FIG. 1.

FIG. 4 is a flow diagram of an embodiment of a method 100 for metering agricultural products using the metering system 32 of the air cart 12. The method 100 may be performed as an automated procedure by a system, such as the control assembly 40 shown in FIGS. 1 and 2. Although the flow diagram illustrates the steps in a certain sequence, it should be understood that the steps may be performed in any suitable order and certain steps may be carried out simultaneously, where appropriate. Further, certain steps shown in FIG. 4 may be omitted and additional steps may be added.

As shown, in step 102, a prescription rate map, or signals indicative of the prescription rate map or prescribed product application rates for various regions of the field, is received at the control circuit. The prescription rate map may be input by the operator directly into the control circuit, or may be received from an external device (e.g., computing device) via a wired or wireless connection, for example. The prescription rate map may be generated by an operator (or by the control assembly or other computing device) based on any suitable factor or combination of factors, such as previous yield (e.g., yield from the various regions of the field during previous planting seasons), prescribed product types, soil conditions, operator preferences, or the like. The prescription rate map is indicative of prescribed product application rates for respective regions of the field. For example, in FIG. 3, the region 62 and the region 64 may have different prescribed product application rates.

In step 104, a geographic location of the implement is received at the control assembly. As noted above, as the implement moves across the field, the control circuitry may receive signals indicative of the location of the implement via the GPS sensor, or any other suitable sensor. The GPS sensor may be disposed on a tractor towing the implement, and the location of the implement and the positions of various metering systems or metering sections may be derived based on data related to the location of these components relative to the GPS sensor on the tractor. In certain embodiments, the GPS sensor may be disposed on the air cart or the implement. In some cases, multiple GPS sensors may be disposed on the implement, such as at each metering system or metering section to facilitate determination of their locations as the implement travels across the field.

In step 106, a signal indicative of a ground speed of the implement is received at the control circuitry. The ground speed may be obtained via any suitable sensor, such as a speed sensor or the GPS sensor. As noted herein, the ground speed of the implement may enable the control circuitry to determine when the implement will reach the headlands region of the field, and thus, when to control the metering system and/or the air source so as to be turned off in the headlands region of the field. In some cases, the control circuitry may reference and/or calculate the delivery time of the product (e.g., the first delay time) and/or the clean out time of the product distribution lines (e.g., the second delay time). The control circuitry may then control the metering system and/or the air source (and/or the damper) based on when the implement will be in the headlands region of the field, the delivery time of the product, and/or the clean out time of the product distribution lines.

In step 108, data from the sensors may provide one or more parameters, such as the locations and quantities of the products left in the product distribution lines and/or their corresponding flow rates. The control circuitry may then control the air source and/or other devices (e.g. the damper) to adjust the actual air flow rate in the conduit to substantially correspond to the desired air flow rate (e.g., feedback loop). Additionally or alternatively, the control circuitry may utilize the data from the sensors to determine and/or to confirm that it is appropriate to control the air source to reduce the air stream in the conduit as the agricultural system approaches or travels in the headlands portion of the field.

In step 110, the control circuitry may determine the fan speed for the air source based on the prescription rate map, the geographic position, the ground speed, and/or the data from the sensors. As noted herein, the ground speed of the implement may enable the control circuitry to determine when the implement will reach the headlands region of the field. Additionally, the control circuitry may reference and/or calculate the delivery time of the product (e.g., the first delay time) and/or the clean out time (e.g., the second delay time). The control circuitry 46 may then determine the fan speed for the air source 34 (e.g., a reduced, non-zero fan speed; stop to zero) and an appropriate time to adjust the fan speed for the air source (e.g., in coordination with the metering system; to be at the fan speed while approaching or in the headlands region of the field).

It should be appreciated that the control circuitry may utilize one or more algorithms, look up tables, models, empirical and/or historical data (e.g., acquired by the sensors) to determine the clean out time and/or the fan speed based on other factors, such as based on product type, current product load in the product distribution environmental conditions, implement type and/or characteristics (e.g., product distribution line length), a size of the headlands or other region with zero product prescribed, a drive time to and/or an expected time of travel through the headlands region or other region with zero product prescribed, or the like. For example, the control circuitry may reduce the fan speed to a first, higher non-zero speed for a first product type or a first region with a shorter expected time of travel (e.g., below a first time threshold, such as 30 seconds), may reduce the fan speed to a second, lower non-zero speed for a second product type or a second region with a longer expected time of travel (e.g., between the first time threshold and a second time threshold, such as 60 seconds), and may reduce the fan speed to zero (e.g., shut off, stop) for a third product type or a third region with an even longer expected time of travel (e.g., above the second time threshold).

In step 112, the control circuitry may send a signal to a hydraulics controller indicating an operating mode of the air source at the appropriate time (e.g., the fan speed or turning off completely). The hydraulics controller may instruct a flow control device (e.g., a hydraulic valve or fan pump) to control the hydraulic fluid provided to the air source to operate the air source (e.g., the flow rate from the air source) at the operating mode.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system configured to distribute an agricultural product in a field, the agricultural system comprising:
    a metering system configured to meter the agricultural product from a storage tank into a conduit;
    an air conveyance system comprising a fan configured to produce an air stream in the conduit to move the agricultural product through the conduit toward a distribution device;
    one or more sensors positioned along the conduit to measure one or more parameters of the agricultural product in the conduit, the air stream in the conduit, or both; and
    control circuitry configured to control operation of the fan based on the one or more parameters, wherein the control circuitry is configured to:
        control the operation of the fan by reducing a speed of the fan to provide a reduced speed of the fan while the agricultural system travels through a headlands portion of the field; and
        control the operation of the fan by increasing the speed of the fan from the reduced speed as the agricultural system approaches or crosses a boundary to travel out of the headlands portion of the field.

2. The agricultural system of claim 1, wherein the air conveyance system comprises a damper configured to adjust the air stream in the conduit.

3. The agricultural system of claim 1, wherein the control circuitry is configured to control the operation of the fan by adjusting the speed of the fan based on the one or more parameters.

4. The agricultural system of claim 3, wherein the control circuitry is configured to control the operation of the fan by adjusting the speed of the fan based on a type of the agricultural product.

5. The agricultural system of claim 1, wherein the control circuitry is configured to control the operation of the fan by turning off the fan.

6. The agricultural system of claim 1, wherein the one or more sensors comprise an air velocity sensor, a product flow sensor, a pressure sensor, an optical sensor, a motion sensor, a sound sensor, or any combination thereof.

7. The agricultural system of claim 1, wherein the control circuitry is configured to:
    receive a map of the field;
    receive a location of the agricultural system in the field; and
    control the operation of the fan based on the map and the location of the agricultural system in the field.

8. The agricultural system of claim 7, wherein the control circuitry is configured to control the metering system to block flow of the agricultural product from the storage tank to the conduit as the agricultural system travels through the headlands portion of the field.

9. The agricultural system of claim 7, wherein the control circuitry is configured to control the operation of the fan by reducing the speed of the fan prior to raising the distribution device away from the field as the agricultural system approaches or travels through the headlands portion of the field.

10. An agricultural system configured to distribute an agricultural product in a field, the agricultural system comprising:
- a metering system configured to meter the agricultural product from a storage tank into a conduit;
- an air conveyance system comprising a fan configured to produce an air stream in the conduit to move the agricultural product through the conduit toward a distribution device;
- one or more sensors configured to monitor one or more parameters indicative of a lack of the agricultural product in the conduit; and
- control circuitry configured to:
  - receive a prescription rate map of the field;
  - monitor a location of the agricultural system in the field;
  - control the metering system to block flow of the agricultural product from the storage tank to the conduit as the agricultural system approaches a headlands portion of the field;
  - control the fan to reduce a speed of the fan in response to the agricultural system approaching or being in the headlands portion of the field and sensor data from the one or more sensors indicating the lack of the agricultural product in the conduit; and
  - control the fan to increase the speed of the fan in response to the agricultural system approaching or crossing a boundary to travel away from the headlands portion of the field.

11. The agricultural system of claim 10, wherein the air conveyance system comprises a damper configured to adjust the air stream in the conduit.

12. The agricultural system of claim 10, wherein the one or more sensors comprise an air velocity sensor, a product flow sensor, a pressure sensor, an optical sensor, a motion sensor, a sound sensor, or any combination thereof.

13. The agricultural system of claim 10, wherein the control circuitry is configured to turn off the fan to reduce the speed of the fan.

14. The agricultural system of claim 10, wherein the control circuitry is configured to control the fan to reduce the speed of the fan prior to raising the distribution device away from the field as the agricultural system approaches or travels through the headlands portion of the field.

15. An agricultural system configured to distribute an agricultural product in a field, the agricultural system comprising:
- a metering system configured to meter the agricultural product from a storage tank into a conduit;
- an air conveyance system comprising a fan configured to produce an air stream in the conduit to move the agricultural product through the conduit toward a distribution device;
- one or more sensors positioned along the conduit to measure one or more parameters of the agricultural product in the conduit, the air stream in the conduit, or both; and
- control circuitry configured to control operation of the fan based on the one or more parameters, wherein the control circuitry is configured to control the metering system to block flow of the agricultural product from the storage tank to the conduit as the agricultural system travels through a headlands portion of the field.

16. An agricultural system configured to distribute an agricultural product in a field, the agricultural system comprising:
- a metering system configured to meter the agricultural product from a storage tank into a conduit;
- an air conveyance system comprising a fan configured to produce an air stream in the conduit to move the agricultural product through the conduit toward a distribution device;
- one or more sensors positioned along the conduit to measure one or more parameters of the agricultural product in the conduit, the air stream in the conduit, or both; and
- control circuitry configured to control operation of the fan based on the one or more parameters, wherein the control circuitry is configured to control the operation of the fan by reducing a speed of the fan prior to raising the distribution device away from the field as the agricultural system approaches or travels through a headlands portion of the field.

* * * * *